United States Patent [19]
Müller

[11] 3,785,210
[45] Jan. 15, 1974

[54] BALANCING APPARATUS FOR BALANCING OUT-OF-BALANCE BODIES

[75] Inventor: Richard Müller, Worfelden, Germany

[73] Assignee: Gebr. Hofmann KG, Damstadt, Germany

[22] Filed: Feb. 3, 1972

[21] Appl. No.: 223,213

[30] Foreign Application Priority Data
Mar. 26, 1971 Germany.................. P 21 14 770.6

[52] U.S. Cl..................................... 73/459, 73/474
[51] Int. Cl. ............................................ G01m 1/22
[58] Field of Search..................... 73/459, 462, 471, 73/474, 475

[56] References Cited
UNITED STATES PATENTS
3,605,502   9/1971   Hack..................................... 73/471
FOREIGN PATENTS OR APPLICATIONS
964,937   7/1964   Great Britain....................... 73/471

*Primary Examiner*—James J. Gill
*Attorney*—Cushman, Darby & Cushman

[57] ABSTRACT

An apparatus for balancing a body such as a motor vehicle wheel in two balancing planes whereby a driving shaft is supported by two separated bearings, one movable and the other immovable and, each having a force measuring device associated with it for each measuring the force which the shaft applies to its associated bearing. The force measuring devices are connected via suitable resistances to a two position switch which in turn is connected to an indicator for displaying imbalance. The switch has a first position connecting both force measuring devices to the indicator so that, when the body is mounted with one of the planes coinciding with the immovable bearing, the indicator displays the imbalance in that plane after imbalance in the other plane has been corrected. The second switch position connects only the force measuring device associated with the movable bearing to the indicator so that, when the body is mounted with the one of the planes coinciding with the immovable bearing, the indicator displays the imbalance in that other plane.

10 Claims, 1 Drawing Figure

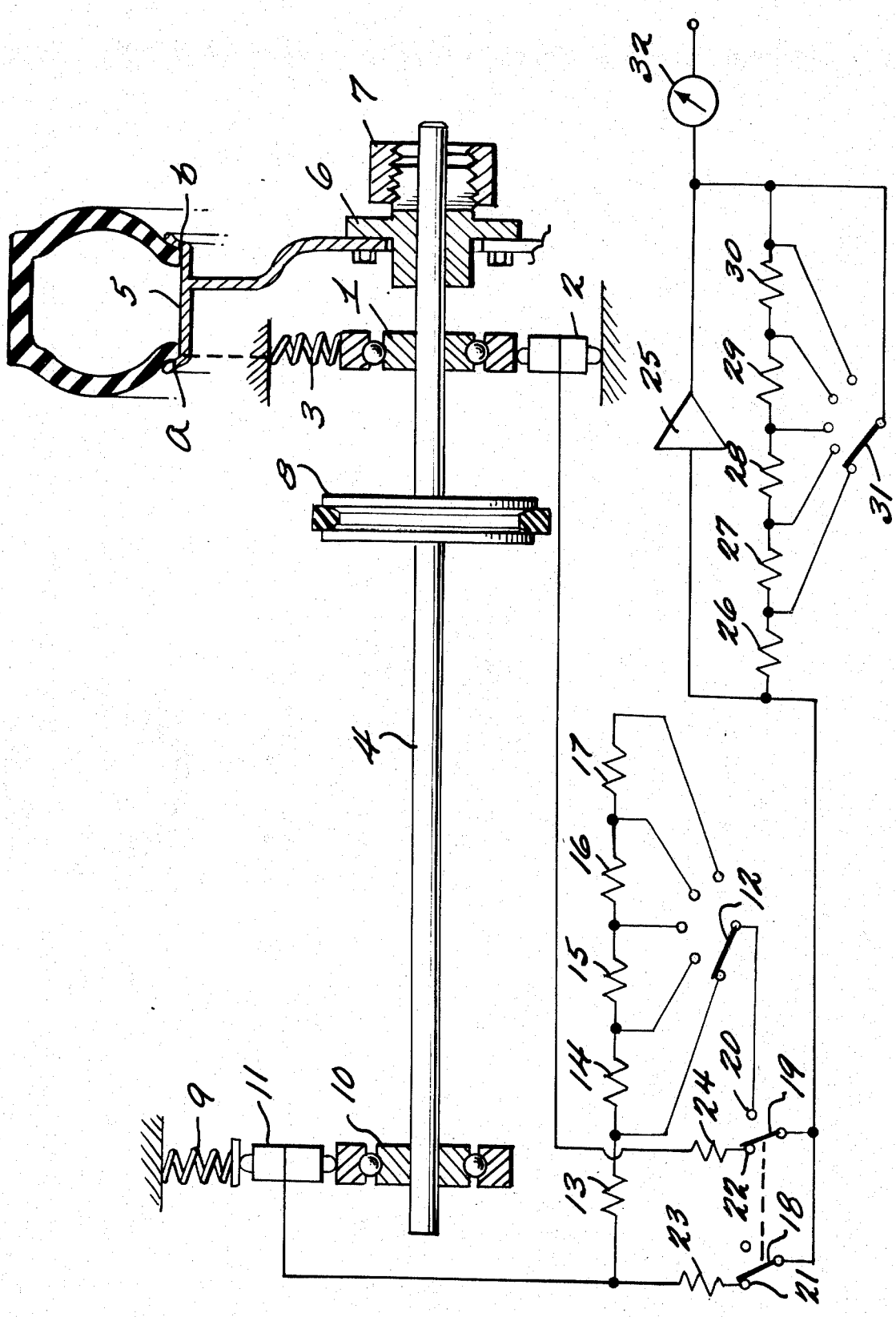

BALANCING APPARATUS FOR BALANCING OUT-OF-BALANCE BODIES

This invention relates to balancing apparatus for balancing out-of-balance bodies such as motor vehicle wheels.

Apparatus has been proposed for this purpose in which the unbalance is determined in two balancing planes, the apparatus having a displacing and clamping device by means of which the out-of-balance body can be displaced and clamped on a drive shaft such that a first balancing plane coincides with one of two bearings of the drive shaft, which bearing is in the form of a radially immovable swing bearing supported on a rigid force-measuring element, while the other bearing is radially movable and can be connected to a measuring and an indicator instrument. In a first measuring run the unbalance in the second balancing plane is determined and eliminated, whereupon the unbalance in the first balancing plane is determined in a second measuring run.

One previous form of balancing machine, in particular for balancing motor vehicle wheels includes a flange on which the wheel to be balanced is carried and sliding means to permit the wheel to be axially displaced on the balancing machine shaft and firmly clamped at any position thereon. The drive shaft or spindle of the balancing machine is guided in a swing bearing or in a ball bearing which is provided with a spring-loaded link or joint. The wheel is clamped on the shaft or spindle in such a way that a first balancing plane lies at the point of oscillation or pivotal movement of the hearing. During rotation therefore, unbalance in this first plane is carried by the swing bearing and the shaft will not carry out any swing movements resulting from the unbalance in this plane. Unbalance in the second balancing plane however, will lead to swing movements about the point of oscillation of the bearing, such movements depending on the magnitude of the unbalance and the distribution of weight of the wheel. In most cases these movements are measured by a vibration measuring means which is disposed at the other end of the shaft or spindle, and indicated by way of a conventional measuring means. From this indication it is possible to determine and display the magnitude and the angular position of the unbalance in the second balancing plane, which does not lie at the point of oscillation of the bearing. After the unbalance has been determined and corrected in the second balancing plane, the unbalance in the first balancing plane, being the plane in which the swing bearing lies, is then also determined and eliminated. Static balancing is employed in this case, the wheel being allowed to rotate until the heavy point forming unbalance is at the lowest position. The unbalance determined in this manner can only be present in the first balancing plane and can thus also be removed in that plane.

One disadvantage of balancing a wheel in two balancing planes in this fashion is that the static balancing of the wheel for determining the unbalance in one of the two balancing planes can only be carried out with sufficient accuracy if the friction at the shaft bearing is sufficiently low. For this purpose, in most cases the motor drive is disconnected from the drive shaft of the balancing machine. This, however, involves expensive mechanical structure. In addition, determining the precise position of the unbalance and determining the balance weight necessary for balancing is relatively time-consuming and also depends on the skill of the operator. The balancing weight required and the angular position of the unbalance can in most cases only be determined by trial and error. Particularly when the unbalance is relatively small, precise balancing is often not possible, especially as no indication as to the actual condition of balance of the wheel can be given.

Force-measuring balancing machines have also been proposed, which have rigid bearings and in which the unbalance can be determined in one run for both wheel planes in known manner. Such balancing machines with rigid bearings suffer from the disadvantage, relative to the above described constructions, that they must have an expensive rigid foundation and a relatively rigid shaft, so as to ensure satisfactory separation of the planes. If separation of the planes is not satisfactory, after the measured unbalance has been removed, checking runs must be made to determine and remove any residual unbalance. This means that either additional balancing weights must be fitted or that the weights which have already been fitted must be removed again and changed.

In the first mentioned balancing machines with a swing shaft this disadvantage does not arise, as even if the radial rigidity of the swing bearing is insufficient, swing movements arising from unbalance in the plane of the swing bearing scarcely occur, so that the swing movement represents a measurement of the unbalance in the second plane which does not include the swing bearing.

In a swing bearing machine as proposed by the applicants German Pat. No. 1,108,475, it is no longer necessary to determine the unbalance in the plane of the swing bearing by static rolling of the wheel. This unbalance is determined in a second measuring run in which the rigid force-measuring element which supports the radially immovable swing bearing is connected to the measuring and indicator instrument by changing over a switch, while a transducer which is connected to the radially movable bearing is at the same time separated from the measuring and indicator instrument. The disadvantages, in particular lack of precision, which are caused by static rolling of the wheel, can thus be eliminated. However, this improved swing bearing machine also leaves something to be desired, in particular as regards the fact that the forces in the swing bearing must be determined by way of a force-measuring element, while the swing movements at the radially movable bearing must be determined by a transducer which measures travel or speed. The electrical circuit must therefore be so constructed that it can be connected both to the force-measuring element and also to the travel or speed measuring transducer. Another possible disadvantage is that the swing movements are dependent on the ratio of the lever arms between the two balancing planes to the spacing of the two bearings, and that the weight distribution of the out-of-balance body to be balanced is included in the measuring result.

According to the present invention, there is provided apparatus for balancing an out-of-balance body in two balancing planes, the apparatus including a drive shaft for carrying the body to be balanced, a first bearing supporting the drive shaft and being in the form of a radially immovable swing bearing supported by a rigid force-measuring element, a radially movable second bearing supporting the shaft and being supported by a second rigid force-measuring element and a spring; means for mounting the body to be balanced on the drive shaft to permit the body to be displaced in the axial direction of the shaft and then locked thereto in a position such that a first of the balancing planes coincides with the first bearing, measuring and indicator means, and switch means for connecting the measuring and indicator means selectively to the second force-measuring element or to the first and second force-measuring elements in parallel, the arrangement being such that in operation in a first measuring run the second force-measuring element is connected by the switch means to the measuring and indicator means whereby the balance in the second balancing plane can be determined, and then corrected, and in a second force-measuring run the first force-measuring element and the second force-measuring element are connected in parallel by the switch means to the measuring and indicator means, thereby to determine the unbalance in the first measuring plane.

In accordance with a preferred embodiment of the apparatus, the spring associated with the radially movable bearing is relatively hard and is so adjusted that the swing resonance frequency about the swing bearing, together with the out-of-balance body to be balanced, lies above, in particular just above the speed of rotation of the drive shaft.

In accordance with another preferred embodiment, to control the sensitivity of the measuring instrument and to take account of the spacing between the two balancing planes, as determined by the spacing between the wheel rim flanges, the apparatus includes a step switch or a potentiometer, which step switch or potentiometer can be cut out during the second measuring run. This gives the advantage that the spacing between the two balancing planes can be taken into account or adjusted.

In accordance with a further preferred embodiment, to take account of the balancing radius of the two balancing planes, and for direct indication of the magnitude of the unbalance in grams or other suitable weight units at the indication instrument, the apparatus has a step switch with a plurality of resistors or a potentiometer. This gives the advantage that the diameter or balancing radius which is a characteristic as regards the wheel rim, can be taken into account or adjusted.

A balancing apparatus according to the present invention will now be described by way of example with reference to the accompanying drawing which shows a diagrammatic view of the apparatus.

The balancing apparatus illustrated in the drawing has a main drive shaft 4 which is driven by means of a pulley wheel 8 by a drive motor (not shown). The drive shaft 4 is carried adjacent one end in a radially immovable swing or pivot bearing 1 and at the other end in a radially movable ball bearing 10, the bearing 10 being engaged by a rigid force-measuring element 11 and a relatively hard spring 9 in such a way that with a motor vehicle wheel 5 to be balanced, the resonance frequency lies above the speed of rotation of the machine. Swing bearing 1 is pressed into frictional engagement with a rigid load cell or force-measuring element 2 by a swing 3 so that no movement of the drive shaft 4 in the radial direction of the swing bearing 1 is possible. Spring 3 (illustrated diagrammatically) is preferably constructed in the form of a spring-loaded link or spring joint such that the radial bearing forces are transmitted in their entirety and without restraint to the force-measuring element 2 without the swinging of the bearing 1 being impaired.

Motor vehicle wheel 5 or another out-of-balance body to be balanced has two balancing or correction planes a and b. The wheel 5 is fitted to a support flange 6 which is arranged displaceably on the drive shaft 4. The wheel 5 can be locked firmly on the drive shaft 4 by means of a clamping device 7 so that by a preliminary displacement the swing point or the point of oscillation of the swing bearing 1 is brought to lie in the balancing plane a. As the opposite bearing 10 is slightly movable radially, swing movements about the bearing 1 are produced in a first measuring run by the unbalance in the plane b, such movements being transmitted by the bearing 10 to the force-measuring element 11.

The angular location of imbalance can be determined in any conventional fashion, for example, with a stroboscope alternately techniques such as described in German Pat. No. 1,108,475 can be employed.

In the first measuring run, a measuring device 25 which can be for example in the form of a measuring amplifier, together with an indicator instrument 32 connected downstream thereof, are connected by way of an arm 19 of a switch arm assembly 18 and 19, a contact 20, another switch arm 12 and series-connected resistors 13, 14, 15, 16 and 17, to the force-measuring element 11 of the radially movable bearing 10. In this case the switch arm assembly 18 and 19 lies with its two arms 18 and 19 in their right-hand position (not shown). With this circuit connection, in the first measuring run the unbalance in the balancing plane b is thus indicated instrument at the indicator instrument 32, the voltage delivered by the force-measuring element 11 representing a measurement of the unbalance in the plane b. As is readily apparent, any desired series connection of the resistors 13 to 17 can be selected by means of the switch arm 12. This means it is possible, in a very simple manner, for the lever arm between the two balancing planes a and b relative to the spacing of the two bearings 1 and 10 to be taken into account or adjusted.

After detecting and eliminating unbalance in the plane b, the switch arms 18 and 19 are switched over into the left-hand position shown, so that the input of the amplifier 25 is connected by way of the two arms 18 and 19, two contacts 21 and 22 and two downstream-connected resistors 23 and 24, to both force-measuring elements 11 and 2 of the two bearings 1 and 10. In this way, the two force-measuring elements 11 and 2 are in essence connected in parallel, and consequently only static unbalance of the wheel can be measured and indicated. As the unbalance in the balancing plane b has already been eliminated however, this static unbalance or centrifugal force now measured in the second measuring run directly corresponds to unbalance in the balancing plane a.

So that the indicator instrument 32 will indicate the unbalance directly in suitable balancing units such as grams or the like, the apparatus also has a plurality of series-connected resistors 26, 27, 28, 29 and 30 which lie parallel to the measuring amplifier 25 and which can be selectively cut in by means of a switch arm 31. In this way, in a very simple manner, the balancing radius of the two balancing planes a and b can be taken into account and an indication in balancing units which is independent of the weight and diameter of the wheel 5 can be obtained for both balancing planes at the indicator instrument 32.

Obviously, instead of the step switches 12 and 31 and the respective associated resistors 13 to 17 and 26 to 30, potentiometers can also be provided which are calibrated to the diameter of the motor vehicle wheel and the spacing of the rim planes *a* and *b*. The measuring amplifier 25 is a known amplifier which is suitable for out-of-balance measurement. As the speed of rotation at which the unbalance is measured and determined, is always constant, the unbalance can always be read off directly at the instrument 32 in suitable balancing units.

Many changes and modifications in the above embodiments of the invention can be made without departing from the scope of the invention. Accordingly, that scope is intended to be limited only by the scope of the appended claims.

What we claim is:

1. Apparatus for balancing an out-of-balance body in two balancing planes, comprising:
    a drive shaft for carrying the body to be balanced;
    a first bearing supporting the drive shaft and being in the form of a radially immovable swing bearing supported by a rigid force-measuring element;
    a radially movable second bearing supporting the shaft and being supported by a second rigid force-measuring element and a spring;
    means for mounting the body to be balanced on the drive shaft so as to permit the body to be displaced in the axial direction of the shaft and then locked thereto in a position such that a first of the balancing planes coincides with the first bearing;
    measuring and indicator means; and
    switch means for connecting the measuring and indicator means selectively to the second force-measuring element or to the first and second force-measuring elements in parallel, the arrangement being such that in operation in a first measuring run the second force-measuring element is connected by the switch means to the measuring and indicator means whereby the balance in the second balancing plane can be determined, and then corrected, and in a second measuring run the first force-measuring element and the second force-measuring element are connected in parallel by the switch means to the measuring and indicator means, thereby to determine the unbalance in the first measuring plane.

2. Apparatus according to claim 1 wherein the spring is relatively hard and is so adjusted that in operation the resonance frequency of the swing movement about the first swing bearing, together with the body to be balanced, lies above the speed of rotation of the drive shaft.

3. Apparatus according to claim 1 further including a first step switch with a plurality of resistors to control the sensitivity of the measuring and indicator means and to take account of the spacing of the first and second balancing planes, which first step switch can be cut out during the second measuring run.

4. Apparatus according to claim 3 wherein said resistors are connected in series between the second force-measuring element of the radially movable bearing and the measuring and indicator means.

5. Apparatus according to claim 1 further including a first potentiometer to control the sensitivity of the measuring and indicator means and to take account of the spacing of the first and second balancing planes, which potentiometer can be cut out during the second measuring run.

6. Apparatus according to claim 1 further including a second step switch with a plurality of resistors or a second potentiometer, to take account of the balancing radius of the first and second balancing planes and for direct indication of the magnitude of unbalance in grams or in another suitable weight unit at the measuring and indicator means.

7. Apparatus according to claim 1 wherein the first bearing is pressed into frictional engagement with the first force-measuring element by a spring.

8. An apparatus for balancing a body in two balancing planes comprising:
    a drive shaft,
    means for mounting said body on said shaft so that said body is axially displaceable along said shaft,
    a first radially immovable bearing supporting said shaft,
    first force-measuring means associated with said first bearing for measuring the force applied by said shaft to said first bearing,
    a second radially movable bearing supporting said shaft,
    second force-measuring means associated with said second bearing for measuring the force applied by said shaft to said second bearing,
    means for indicating imbalance, and
    switch means connecting said first and second force-measuring means to said indicating means having a first position connecting both said first and second force-measuring means to said indicating means so as to indicate the imbalance in one of said planes when said body is mounted so that said one plane coincides with said first bearing and a second position connecting only said second force measuring means to said indicating means so as to indicate the imbalance in the other of said plane when said body is mounted so that said one plane coincides with said first bearing.

9. Apparatus as in claim 8 further including resistive means connecting said first and second force-measuring means to said switch means and having values so as to compensate for the difference in distance from said other measuring plane to said first and second bearings.

10. A method of balancing a body in two balancing planes with an apparatus having:
    a drive shaft,
    means for mounting said body on said shaft so that said body is axially displaceable along said shaft,
    a first radially immovable bearing supporting said shaft,
    first force measuring means associated with said first bearing for measuring the force applied by said shaft to said first bearing,
    a second radially movable bearing supporting said shaft,
    second force-measuring means associated with said second bearing for measuring the force applied by said shaft to said second bearing,
    means for indicating imbalance, and
    switch means connecting said first and second force-measuring means to said indicating means having a first position connecting both said first and second force-measuring means to said indicating means so as to indicate the imbalance in one of said planes when said body is mounted so that said one plane coincides with said first bearing and a second position connecting only said second force-measuring means to said indicating means so as to indicate the imbalance in the other of said plane when said body is mounted so that said one plane coincides with said first bearing, comprising the steps of:

mounting said body on said shaft so that said one plane coincides with said first bearing, measuring said imbalance in said one plane with said switch means in said first position, and measuring said imbalance in said other plane with said switch means in said second position.

\* \* \* \* \*